US012790225B2

(12) United States Patent
Yue et al.

(10) Patent No.: US 12,790,225 B2
(45) Date of Patent: *Nov. 10, 2026

(54) NEUTRAL POLYMER-ORIENTED HIERARCHICAL PORE BETA MOLECULAR SIEVE AND ENVIRONMENT-FRIENDLY PREPARATION METHOD THEREOF

(71) Applicant: FUZHOU UNIVERSITY, Fuzhou (CN)

(72) Inventors: Yuanyuan Yue, Fuzhou (CN); Yuan Hu, Fuzhou (CN); Xiaojun Bao, Fuzhou (CN); Chan Wang, Fuzhou (CN); Tinghai Wang, Fuzhou (CN); Haibo Zhu, Fuzhou (CN)

(73) Assignee: Fuzhou University, Fuzhou (CN)

( * ) Notice: Subject to any disclaimer, the term of this patent is extended or adjusted under 35 U.S.C. 154(b) by 787 days.

This patent is subject to a terminal disclaimer.

(21) Appl. No.: 17/794,115

(22) PCT Filed: Mar. 10, 2021

(86) PCT No.: PCT/CN2021/079959

§ 371 (c)(1),
(2) Date: Jul. 20, 2022

(87) PCT Pub. No.: WO2022/165912

PCT Pub. Date: Aug. 11, 2022

(65) Prior Publication Data

US 2023/0183078 A1 Jun. 15, 2023

(30) Foreign Application Priority Data

Feb. 5, 2021 (CN) ........................ 202110162878.5

(51) Int. Cl.
*C01B 39/04* (2006.01)

(52) U.S. Cl.
CPC .......... *C01B 39/04* (2013.01); *C01P 2006/12* (2013.01); *C01P 2006/14* (2013.01); *C01P 2006/16* (2013.01)

(58) Field of Classification Search
CPC ................................ C01B 39/04; C01B 39/36
See application file for complete search history.

(56) References Cited

U.S. PATENT DOCUMENTS

2018/0311652 A1 11/2018 Zhang et al.

FOREIGN PATENT DOCUMENTS

CN 102826565 A 12/2012
CN 104646047 A 5/2015
(Continued)

OTHER PUBLICATIONS

CN-108069437-A machine translation (Year: 2018).*
(Continued)

*Primary Examiner* — Sally A Merkling
*Assistant Examiner* — Nicole Lee Quist
(74) *Attorney, Agent, or Firm* — Olive Law Group, PLLC

(57) ABSTRACT

The present invention relates to the technical field of molecular sieves, in particular to a neutral polymer-oriented hierarchical pore Beta molecular sieve and an environment-friendly preparation method thereof. The environment-friendly preparation method of the neutral polymer-oriented hierarchical pore Beta molecular sieve includes the following steps: preparing a sample by a hydrothermal method with nitrogen-free polyketal as a template agent; and conducting acid treatment on the obtained sample to remove the template agent and to obtain the hierarchical pore Beta molecular sieve. The hierarchical pore Beta molecular sieve is a nano-mesoporous molecular sieve, a mesopore diameter thereof is concentrated at 10 to 20 nm, a crystal grain size thereof is 30 to 120 nm, a specific surface area thereof is 700
(Continued)

to 820 $m^2/g$, and a pore volume thereof is 0.75 to 0.92 $cm^3/g$. The present application can solve the problems such as collapse of a molecular sieve structure caused by high-temperature roasting, emission of harmful gases and non-recyclability of the template agent. Moreover, the prepared Beta molecular sieve is a hierarchical pore molecular sieve, and has the advantages of nano-single crystal structure, high specific surface area, high pore volume and the like.

8 Claims, 2 Drawing Sheets

(56) References Cited

FOREIGN PATENT DOCUMENTS

| | | | | | |
|---|---|---|---|---|---|
| CN | 108069435 | A | | 5/2018 | |
| CN | 108069437 | A | * | 5/2018 | .......... B01J 29/7007 |
| CN | 109467099 | A | | 3/2019 | |
| WO | WO-2010150996 | A2 | * | 12/2010 | ................ B01J 2/06 |

OTHER PUBLICATIONS

Hyunjoo Lee, "A New Strategy for Synthesizing Zeolites and Zeolite-like Materials", California Institute of Technology, 2005.*

International Search Report and Written Opinion for PCT Patent Application No. PCT/CN2021/079959 dated Nov. 1, 2021, 7 pages (Official Language only).

* cited by examiner

NEUTRAL POLYMER-ORIENTED HIERARCHICAL PORE BETA MOLECULAR SIEVE AND ENVIRONMENT-FRIENDLY PREPARATION METHOD THEREOF

TECHNICAL FIELD

The present invention relates to the technical field of molecular sieves, in particular to a neutral polymer-oriented hierarchical pore Beta molecular sieve and an environment-friendly preparation method thereof.

BACKGROUND

A microporous structure (less than 2 nm) of a silica-alumina molecular sieve has shape selectivity. It has strong acidity, large specific surface area, and high thermal and hydrothermal stability, and is widely used in the synthesis of petrochemicals and fine chemicals. However, its single microporous structure limits the diffusion and mass transfer of molecules in catalytic reactions, which seriously affects the catalytic application of microporous zeolite materials. In order to overcome this limitation, mesopores (2 to 50 nm) can be introduced into microporous crystals, which effectively solves the problems of mass transfer and carbon deposition inactivation caused by the single micropore diameter of traditional microporous molecular sieves.

The open literature (Angew Chem Int Edit, 2006, 45(19), 3090-3093) reported that a hierarchical pore Beta molecular sieve with micropores and mesopores was synthesized by using tetraethylammonium hydroxide as a microporous template agent and using polycationic polydimethyldiallylammonium chloride as a mesoporous template agent with a dual-template method. However, in the dual-template method, there was a problem of competition between two template systems, that is, an ideal hierarchical pore molecular sieve could be obtained only when the two templates match the role of silica-alumina species, otherwise, phase separation was very prone to occurring during crystallization. The open literature (Journal of American Chemistry Society, 2014, 136: 2503-2510) reported that a polyammonium salt was used as a bi-functional template agent to synthesize a single-crystal hierarchical pore Beta molecular sieve, and the single-crystal structure has better hydrothermal stability. Published Patents CN108455629A, CN108069436A, CN103058211A and CN102826564A respectively used a triadius rigid quaternary ammonium salt, (CnH2n+1)4NX (where n=1 to 22; X═OH, Br or Cl) quaternary ammonium salts, an organic amine and a hexaammonium cationic quaternary ammonium salt as template agents to synthesize Beta molecular sieves. Published Patents CN104418351A and CN104418348A used a polyquaternary ammonium salt as a double template agent to synthesize a hierarchical pore Beta molecular sieve.

Organic matters containing ammonium and nitrogen are used in the synthesis process of the above hierarchical pore molecular sieves. Such organic matters are expensive and their costs account for about 70% of the production cost of the molecular sieves. In the post roasting and removal processes of the molecular sieves, the structures of the organic matters are destroyed and cannot be recovered. Moreover, the high temperature process will cause the destruction of the molecular sieve structures, and harmful gases such as carbon dioxide and nitrogen oxides generated by roasting of ammonium and nitrogen organic matters will cause serious pollution to the environment.

In order to reduce the damage to the molecular sieve structure caused by high-temperature roasting, the open literature (Chemical Engineering Journal, 2018, 346, 600-605) reported for the first time that a template agent was removed by hydrocatalytic cracking at a temperature of 613 K, which was applied to removal of template agents of a beta molecular sieve and a TS-1 molecular sieve. A heterogeneous catalyst $Pd/SiO_2$ served as a main source of hydrogen overflow, and active hydrogen atoms overflowing between phases cracked the template agent into small molecular fragments. Although this method can effectively reduce the roasting temperature, the structure of the template agent is destroyed and cannot be recycled, and hydrogen gas and a catalyst need to be introduced and added respectively, which has high requirements for equipment, so the cost cannot be effectively reduced. In order to replace roasting to remove template agents, some studies have used methods such as solvent extraction, supercritical carbon dioxide and dielectric barrier discharge to remove organic template agents from molecular sieves. CN102688608A discloses a method for recovering a mesoporous molecular sieve organic template agent, in which, a supercritical carbon dioxide method is used to extract and recover a P123 template agent in a Y molecular sieve, and a recovery rate of the template agent is more than 80%. Although this method can effectively remove and recycle the template agent, it has high requirements for equipment, supercritical carbon dioxide cannot be recycled, and the cost of industrial application is high. CN106145142A discloses a method for removing an organic template agent of a molecular sieve, in which, a dielectric barrier discharge technology is mainly adopted, $O_2$ is selected as plasma working gas, free radicals with extremely high oxidative activity are produced in a discharge process, and under actions of polymerization, substitution, electron transfer, bond breaking and the like between the free radicals and the organic template agent, the organic template agent is decomposed and leaves molecular sieve pore channels in a gaseous state without influencing a crystal structure of the molecular sieve. This method is successfully applied in the removal of a template agent of a beta molecular sieve containing a tetraethylammonium hydroxide organic template agent, but in this method, the template agent structure is destroyed, the template agent cannot be recycled, and the input of a dielectric barrier discharge device increases a preparation cost.

TECHNICAL SOLUTIONS

Aiming at solving the above problems, the present invention provides a neutral polymer-oriented hierarchical pore Beta molecular sieve and an environment-friendly preparation method thereof.

The technical solution of the present invention to solve the problems is to provide an environment-friendly preparation method of a neutral polymer-oriented hierarchical pore Beta molecular sieve, including the following steps:

A. preparing a sample by a hydrothermal method with nitrogen-free polyketal as a template agent; and B. conducting acid treatment on the obtained sample to remove the template agent and to obtain the hierarchical pore Beta molecular sieve.

As a preference of the present invention, a terminal position of the template agent has a hydroxyl group.

As a preference of the present invention, a structural formula of the template agent is as follows:

CK-2

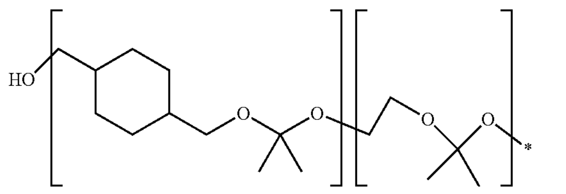

The ketal copolymer can orient synthesis of the hierarchical pore Beta molecular sieve and can be used as a steric inhibitor to synthesize nano-single crystals. Moreover, the ketal copolymer is stable under alkaline conditions and is decomposed under acidic conditions. The ketal copolymer can be removed from a structure of the molecular sieve only by acid treatment, without roasting treatment.

As a preference of the present invention, an acid treatment agent used for the acid treatment includes hydrochloric acid.

As a preference of the present invention, a temperature of the acid treatment is 80° C. to 100° C., and acid treatment time is 5 to 7 hours.

As a preference of the present invention, Step A includes the following steps: a. mixing water, an aluminum source and the template agent evenly, and then adding a silicon source in batches to obtain a gel; b. aging the gel for 5 to 12 hours at 20° C. to 30° C. and then placing the gel in a reaction kettle to be crystallized for 3 to 10 days at 180° C. to 200° C.; c. after crystallization is completed, filtering and drying an obtained solid product to obtain a sample.

As a preference of the present invention, the gel includes, in parts by molar, 1 part of $SiO_2$, 0.01 to 0.05 part of $Al_2O_3$, 0.08 to 0.22 part of $Na_2O$, 35 to 50 parts of $H_2O$ and 0.1 to 0.3 part of the template agent.

As a preference of the present invention, the gel includes, in parts by molar, 1 part of $SiO_2$, 0.01 to 0.05 part of $Al_2O_3$, 0.22 part of $Na_2O$, 50 parts of $H_2O$ and 0.2 part of the template agent.

As a preference of the present invention, the aluminum source includes one or more of sodium metaaluminate, aluminum sulfate, kaolin, and rectorite.

As a preference of the present invention, the silicon source includes one or more of silica sol, tetraethoxysilane, white carbon black, and diatomite.

In order to further guide molecular sieve synthesis, as a preference of the present invention, in Step a, an alkali source may also be added. As a preference of the present invention, the alkali source is selected from sodium hydroxide.

Another object of the present invention is to provide a hierarchical pore Beta molecular sieve, which is a nano-mesoporous molecular sieve, and a mesopore diameter thereof is concentrated at 10 to 20 nm, a crystal grain size thereof is 30 to 120 nm, a specific surface area thereof is 700 to 820 $m^2/g$, and a pore volume thereof is 0.75 to 0.92 $cm^3/g$.

BENEFICIAL EFFECTS

1. A molecular sieve synthesized in the present application contains both micropores and mesopores in a structure, and is of a hierarchical pore structure, which effectively solve a problem of mass transfer caused by a microporous molecular sieve.
2. A template agent used in the present application does not contain nitrogen, and a synthesized Beta molecular sieve can remove the template agent without high-temperature roasting, thereby avoiding emission of harmful gases NO and $CO_2$ and damage to a crystal structure of the molecular sieve caused by high-temperature roasting.
3. Compared with conventional molecular sieves, the Beta molecular sieve synthesized by the method of the present application has a higher specific surface area of 700 to 820 $m^2/g$ and a higher pore volume of 0.75 to 0.92 $cm^3/g$.

DETAILED DESCRIPTION OF EMBODIMENTS

Figure 1:
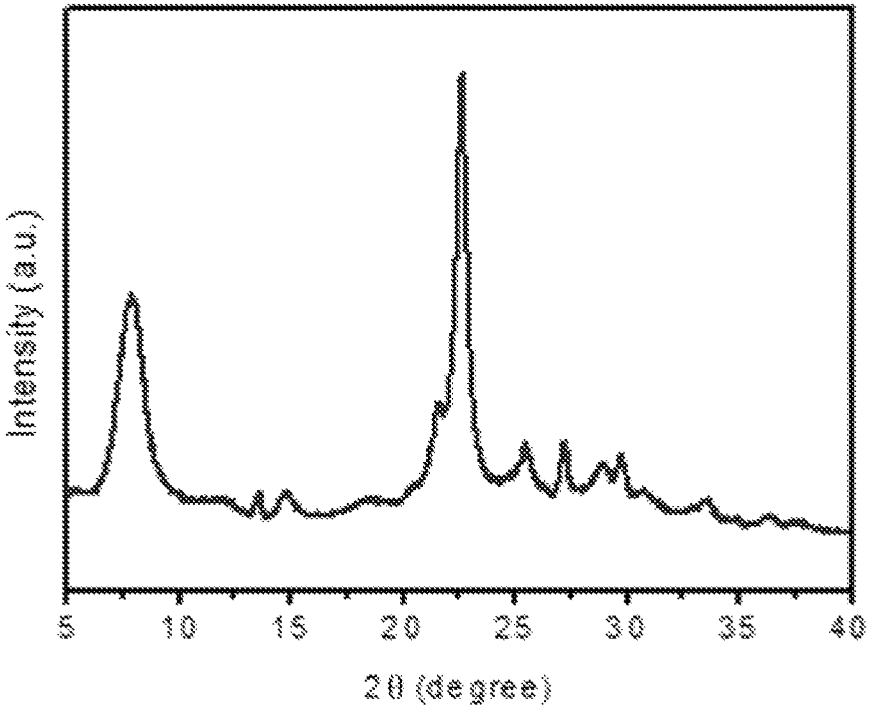
FIG. 1 is an XRD diffractogram of a hierarchical pore Beta molecular sieve prepared in Example 1.

The followings are specific embodiments of the present invention, and in conjunction with the accompanying drawings, the technical solutions of the present invention are further described, but the present invention is not limited to these examples.

An environment-friendly preparation method of a hierarchical pore Beta molecular sieve included the following steps.

A. A sample was prepared by a hydrothermal method with nitrogen-free polyketal as a template agent.

CK-2

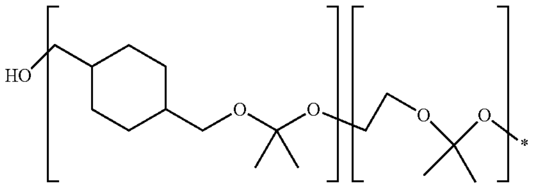

was selected as the template agent.

0.08 g of $NaAlO_2$ and 0.3 g of NaOH were dissolved in 12.1 mL of water to form a clear solution, and then 0.84 g of the above template agent was added into the clear solution. After even stirring, 0.93 g of white carbon black was added. A feeding molar ratio met: 1 ($SiO_2$):0.02 ($Al_2O_3$):0.22 ($Na_2O$):50 ($H_2O$):0.2 (template agent). After aging for 8 hours at 25° C., a gel was transferred into a stainless steel reaction kettle with a polytetrafluoroethylene lining and placed in a 180° C. homogeneous reactor to be crystallized for 144 hours. A product was centrifuged, washed and then dried at 100° C. to obtain a solid sample.

B. Acid treatment was conducted on the obtained sample to remove the template agent and to obtain the hierarchical pore Beta molecular sieve.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product with a crystal grain size of about 65 nm.

An XRD diffractogram of the product was shown in FIG. 1, and a phase of the obtained product is determined by XRD to belong to a Beta molecular sieve, and a relative crystallinity thereof was 98%.

Figure 2:
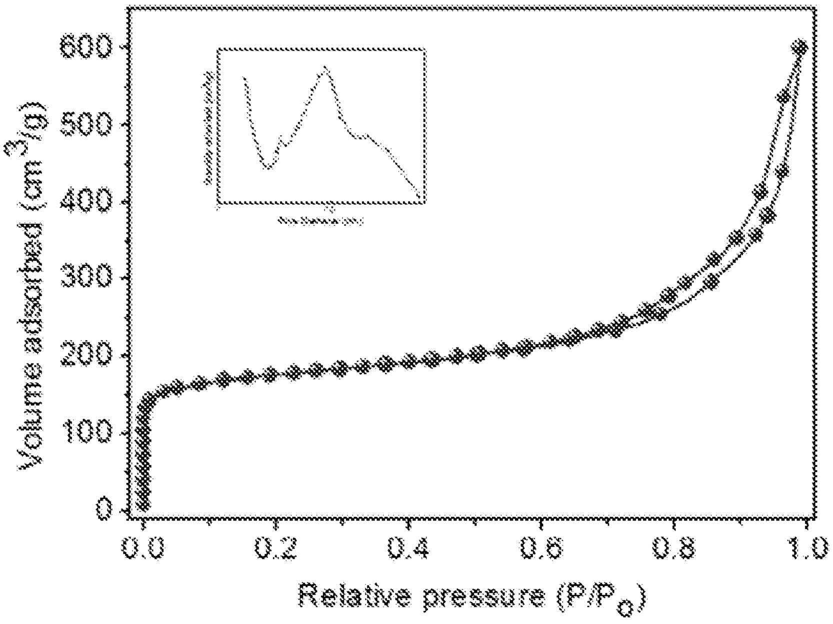
FIG. 2 shows $N_2$ adsorption and desorption curves of the hierarchical pore Beta molecular sieve prepared in Example 1.
Figure 3:
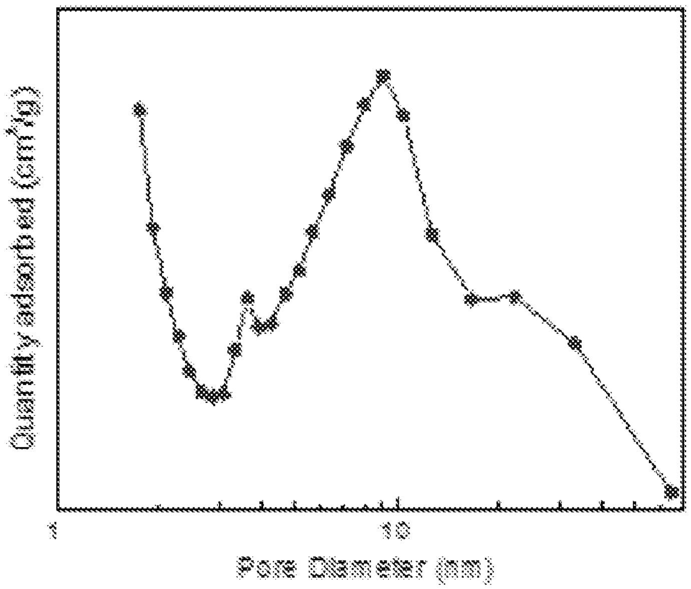
FIG. 3 is a pore diameter distribution diagram of the hierarchical pore Beta molecular sieve prepared in Example 1.

As shown in FIG. 2 and FIG. 3, the product was a hierarchical pore molecular sieve with mesopores, a mesopore diameter thereof was concentrated at 20 nm, a specific surface area thereof was 721 $m^2/g$, and a pore volume thereof was 0.72 $cm^3/g$.

Example 2

An environment-friendly preparation method of a hierarchical pore Beta molecular sieve included the following steps.

A. A sample was prepared by a hydrothermal method with nitrogen-free polyketal as a template agent.

The template agent in Example 1 was used as a template agent, sodium metaaluminate and aluminum sulfate were used as an aluminum source, and tetraethoxysilane was used as a silicon source. After the aluminum source and sodium hydroxide were dissolved in water to form a clear solution, the template agent was added into the clear solution. After even stirring, the silicon source was added. The amount of addition was adjusted to make a feeding molar ratio meet: 1 ($SiO_2$):0.03 ($Al_2O_3$):0.22 ($Na_2O$):50 ($H_2O$):0.2 (template agent). After aging for 8 hours at 25° C., a gel was transferred into a stainless steel reaction kettle with a polytetrafluoroethylene lining and placed in a 190° C. homogeneous reactor to be crystallized for 48 hours. A product was centrifuged, washed and then dried at 100° C. to obtain a solid sample.

B. Acid treatment was conducted on the obtained sample to remove the template agent and to obtain the hierarchical pore Beta molecular sieve.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product.

A phase of the product is determined by XRD to belong to a Beta molecular sieve, and a relative crystallinity thereof was 96%, a crystal grain size thereof was about 25 nm, a mesopore diameter thereof was concentrated at 10 nm, a specific surface area thereof was 750 $m^2/g$, and a pore volume thereof was 0.81 $cm^3/g$.

Example 3

An environment-friendly preparation method of a hierarchical pore Beta molecular sieve included the following steps.

A. A sample was prepared by a hydrothermal method with nitrogen-free polyketal as a template agent.

The template agent in Example 1 was used as a template agent, aluminum sulfate was used as an aluminum source, and silica sol and white carbon black were used as a silicon source. After the aluminum source and sodium hydroxide were dissolved in water to form a clear solution, the template agent was added into the clear solution. After even stirring, the silicon source was added. The amount of addition was adjusted to make a feeding molar ratio meet: 1 ($SiO_2$):0.05 ($Al_2O_3$):0.08 ($Na_2O$):35 ($H_2O$):0.2 (template agent). After aging for 8 hours at 25° C., a gel was transferred into a stainless steel reaction kettle with a polytetrafluoroethylene lining and placed in a 180° C. homogeneous reactor to be crystallized for 240 hours. A product was centrifuged, washed and then dried at 100° C. to obtain a solid sample.

B. Acid treatment was conducted on the obtained sample to remove the template agent and to obtain the hierarchical pore Beta molecular sieve.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product.

A phase of the product is determined by XRD to belong to a Beta molecular sieve, and a relative crystallinity thereof was 92%, a crystal grain size thereof was about 18 nm, a mesopore diameter thereof was concentrated at 12 nm, a specific surface area thereof was 710 $m^2/g$, and a pore volume thereof was 0.71 $cm^3/g$.

Example 4

An environment-friendly preparation method of a hierarchical pore Beta molecular sieve included the following steps.

A. A sample was prepared by a hydrothermal method with nitrogen-free polyketal as a template agent.

The template agent in Example 1 was used as a template agent, commercially available kaolin was used as an aluminum source, and commercially available diatomite used as a silicon source. In particular, the kaolin was mainly composed of 53.14 wt. % of $SiO_2$ and 44.11 wt. % of $Al_2O_3$. Before use, the kaolin needs to be pretreated as follows: 12.00 g of the kaolin was weighed, 16.00 g of sodium hydroxide was added to be mixed evenly, 64.00 g of deionized water was added, and drying was conducted at 200° C. for standby application. The diatomite was mainly composed of 95.35 wt. % of $SiO_2$ and 2.67 wt. % of $Al_2O_3$. Before use, the diatomite also needs to be pretreated as follows: 20.00 g of the diatomite was weighed, and roasted for 4 hours at 600° C. for standby application.

After the aluminum source and sodium hydroxide were dissolved in water to form a clear solution, the template agent was added into the clear solution. After even stirring, the silicon source was added. The amount of addition was adjusted to make a feeding molar ratio meet: 1 ($SiO_2$):0.02 ($Al_2O_3$):0.22 ($Na_2O$):50 ($H_2O$):0.2 (template agent). After aging for 8 hours at 25° C., a gel was transferred into a stainless steel reaction kettle with a polytetrafluoroethylene lining and placed in a 180° C. homogeneous reactor to be crystallized for 144 hours. A product was centrifuged, washed and then dried at 100° C. to obtain a solid sample.

B. Acid treatment was conducted on the obtained sample to remove the template agent and to obtain the hierarchical pore Beta molecular sieve.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product.

A phase of the product is determined by XRD to belong to a Beta molecular sieve, and a relative crystallinity thereof was 96%, a crystal grain size thereof was about 80 nm, a mesopore diameter thereof was concentrated at 20 nm, a specific surface area thereof was 700 $m^2/g$, and a pore volume thereof was 0.60 $cm^3/g$.

Comparative Example 1

This comparative example was basically the same as Example 1, and the difference only lied in that: no template agent was added in this comparative example.

A phase of a product prepared in this comparative example was determined by XRD to belong to a ZSM-5 molecular sieve.

Comparative Example 2

This comparative example was basically the same as Example 2, and the difference only lied in that: no template agent was added in this comparative example.

A phase of a product prepared in this comparative example was determined by XRD to belong to a ZSM-5 molecular sieve.

Comparative Example 3

This comparative example was basically the same as Example 3, and the difference only lied in that: no template agent was added in this comparative example.

A phase of a product prepared in this comparative example was determined by XRD to be amorphous.

Comparative Example 4

This comparative example was basically the same as Example 4, and the difference only lied in that: no template agent was added in this comparative example.

A phase of a product prepared in this comparative example was determined by XRD to be amorphous.

From the examples and the comparative examples, it can be seen that by using nitrogen-free polyketal as a template agent, a hierarchical pore Beta molecular sieve with a high specific surface area and a high pore volume can be synthesized.

The specific embodiments described herein are merely illustrative of the spirit of the present invention. Those skilled in the art to which the present invention pertains can make various amendments or additions to the described specific embodiments or substitute them in similar manners, but it will not deviate from the spirit of the present invention or go beyond the scope defined by the appended claims.

The invention claimed is:

1. An method of a neutral polymer-oriented hierarchical pore Beta molecular sieve, comprising the following steps:

A. preparing a sample by a hydrothermal method with nitrogen-free polyketal as a template agent; and B. conducting acid treatment on the obtained sample to remove the template agent and to obtain the hierarchical pore Beta molecular sieve;

Step A comprises the following steps: a. mixing water, an aluminum source and the template agent evenly, and then adding a silicon source in batches to obtain a gel; b. aging the gel for 5 to 12 hours at 20° C. to 30° C. and then placing the gel in a reaction kettle to be crystallized for 3 to 10 days at 180° C. to 200° C.; c. after crystallization is completed, filtering and drying an obtained solid product to obtain a sample.

2. The method of the neutral polymer-oriented hierarchical pore Beta molecular sieve according to claim 1, wherein a terminal position of the template agent has a hydroxyl group.

3. The method of the neutral polymer-oriented hierarchical pore Beta molecular sieve according to claim 1, wherein an acid treatment agent used for the acid treatment comprises hydrochloric acid.

4. The method of the neutral polymer-oriented hierarchical pore Beta molecular sieve according to claim 1, wherein a temperature of the acid treatment is 80° C. to 100° C., and acid treatment time is 5 to 7 hours.

5. The method of the neutral polymer-oriented hierarchical pore Beta molecular sieve according to claim 1, wherein the gel comprises, in parts by molar, 1 part of $SiO_2$, 0.01 to 0.05 part of $Al_2O_3$, 0.08 to 0.22 part of $Na_2O$, 35 to 50 parts of $H_2O$, and 0.1 to 0.3 part of the template agent.

6. The method of the neutral polymer-oriented hierarchical pore Beta molecular sieve according to claim 1, wherein the aluminum source comprises one or more of sodium metaaluminate, aluminum sulfate, kaolin, and rectorite.

7. The method of the neutral polymer-oriented hierarchical pore Beta molecular sieve according to claim 1, wherein the silicon source comprises one or more of silica sol, tetraethoxysilane, white carbon black, and diatomite.

8. A hierarchical pore Beta molecular sieve prepared by adopting the method of the neutral polymer-oriented hierarchical pore Beta molecular sieve of claim 1, wherein the hierarchical pore Beta molecular sieve is a nano-mesoporous molecular sieve, a mesopore diameter thereof is concentrated at 10 to 20 nm, a crystal grain size thereof is 30 to 120 nm, a specific surface area thereof is 700 to 820 $m^2/g$, and a pore volume thereof is 0.75 to 0.92 $cm^3/g$.

* * * * *